Jan. 18, 1949.                    E. WIITALA                    2,459,401
                                FISHING DEVICE
                           Filed March 18, 1947

Inventor
Elmer Wiitala

By Clarence A. O'Brien
and Harvey B. Jacobson
Attorneys

Patented Jan. 18, 1949

2,459,401

UNITED STATES PATENT OFFICE 2,459,401

FISHING DEVICE

Elmer Wiitala, Kaleva, Mich., assignor of thirty-three and one-third per cent to Reino Wiitala and thirty-three and one-third per cent to Leo Mannila, both of Kaleva, Mich.

Application March 18, 1947, Serial No. 735,499

4 Claims. (Cl. 43—46)

This invention relates to a novel fishing device embodying an artificial bait or lure, and a multiple fish hook spreader pivotally attached to the bait or lure for limited lateral oscillation relative to the latter, so that the hooks on the spreader will reciprocate through small arcs and thereby flutter to attract fish when the device is drawn through the water.

An object of the invention is to provide a device of the above kind in which the spreader includes front and rear pairs of laterally extending arms having means to attach fish hooks to their outer ends, said arms co-acting with the bait or lure to limit the oscillation of the spreader.

A further object is to provide an artificial bait attachment including a novel multiple fish hook spreader, and a bracket in which said spreader is journaled, said bracket being adapted to be secured to the artificial bait so that the spreader will function in the manner above stated.

The exact nature of the present invention, as well as more specific objects and features thereof, will become apparent from the following description when considered in connection with the accompanying drawing, in which.

Figure 1:
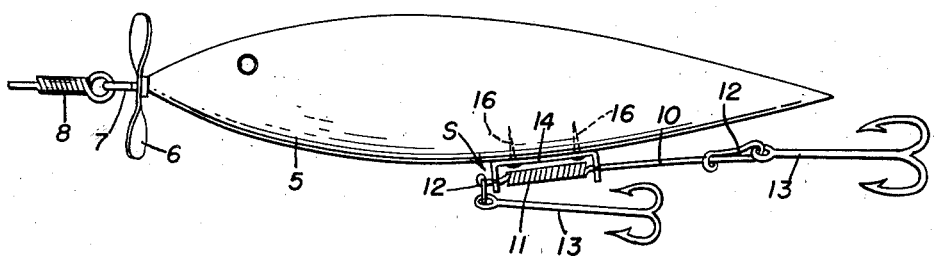
Figure 1 is a side elevational view of a fishing device embodying the present invention.

Referring in detail to the drawing, 5 indicates a conventional artificial bait made in the shape of a minnow and out of wood or the like. As shown, the artificial bait is provided at the front with a rotary spinner 6 journaled on the shank of an eye member 7 attached to the bait and adapted to have a fishing line attached thereto by means of a connection 8.

The present invention embodies a multiple fish hook spreader S which includes front and rear pairs of laterally extending arms 9 and 10, respectively. The spreader is preferably made of two similar lengths of resilient wire which are twisted or otherwise secured together intermediate their ends as at 11, the opposite end portions of the lengths of wire being directed laterally to form the arms 9 and 10. The lengths of wire terminate at each end in safety loops or eyes 12 to which respective hooks 13 may be attached, said hooks being preferably in the nature of multiple or gang hooks as shown. The arms 9 and 10 are of a length to extend beyond opposite sides of the artificial bait 5, and the front arms 9 preferably extend at right-angles to the intermediate portion of the spreader, while the rear arms 10 preferably extend rearwardly in rearwardly diverging relation.

The attachment further includes an inverted U-shaped bracket 14 having the intermediate portion of the spreader journaled in the ends thereof and apertured as at 15 to facilitate rigid fastening of the attachment to the artificial bait 5 by means of screws 16 or the like, so that the intermediate portion of the spreader is disposed longitudinally of and midway between the sides of the artificial bait. The bracket 14 is preferably secured to the under side of the artificial bait as shown, and the arms 9 and 10 of the spreader are located in close proximity to the artificial bait so as to co-act with the latter for limiting the oscillation of the spreader. Limited lateral oscillation of the spreader is thus permitted due to journaling of the same in the bracket 14 and positioning of arms 9 and 10 adjacent but in spaced relation to the artificial bait.

Figure 2:
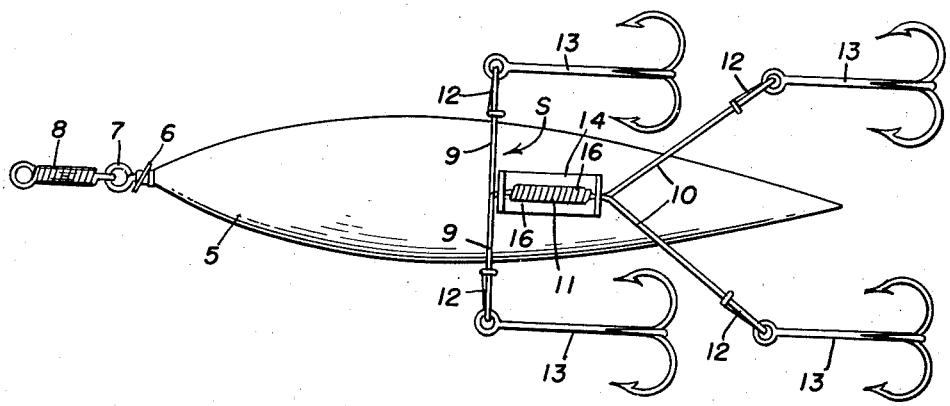
Figure 2 is a bottom plan view thereof.
Figure 3:
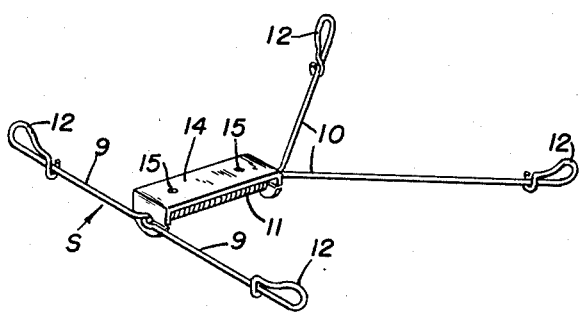
Figure 3 is a perspective view of the artificial bait attachment.

When the device is drawn through the water, the hooks 13 will swing rearwardly and upwardly as generally illustrated in Figures 1 and 2, and the spreader will oscillate laterally so that the hooks 13 will reciprocate through small arcs, thereby fluttering and attracting fish.

From the foregoing description, it is believed that the construction, operation and advantages of the present invention will be readily understood and appreciated by those skilled in the art. Modifications and changes in details of construction are contemplated, such as fall within the scope of the invention as claimed.

What I claim is:

1. A fishing device embodying an artificial bait and a multiple fish hook spreader pivotally attached to the bait for limited lateral oscillation relative to the latter, said spreader including front and rear pairs of laterally extending arms having means to attach fish hooks to their outer ends, said arms co-acting with the bait to limit the oscillation of the spreader.

2. A fishing device embodying an artificial bait, and a multiple fish hook spreader pivotally attached to the bait for limited lateral oscillation relative to the latter, said spreader comprising two similar lengths of resilient wire secured together intermediate their ends and having their ends directed laterally to provide front and rear pairs of arms, said arms terminating in fish hook attaching means.

3. A fishing device embodying an artificial bait, and a multiple fish hook spreader pivotally attached to the bait for limited lateral oscillation relative to the latter, said spreader comprising two similar lengths of resilient wire secured together intermediate their ends and having their ends directed laterally to provide front and rear pairs of arms, said arms terminating in fish hook attaching means, and a bracket in which the intermediate portion of said spreader is journaled, said bracket being attached to the artificial bait so that the arms co-act with the latter to limit oscillation of the spreader.

4. A fishing device embodying an artificial bait and a multiple fish hook spreader pivotally attached to the bait for limited lateral oscillation relative to the latter, said spreader including front and rear pairs of laterally extending arms having means to attach fish hooks to their outer ends, said arms co-acting with the bait to limit the oscillation of the spreader, the front arms of the spreader extending at right-angles to the axis of oscillation of the latter, the rear pair of arms extending rearwardly in rearwardly diverging relation.

ELMER WIITALA.

REFERENCES CITED

The following references are of record in the file of this patent:

UNITED STATES PATENTS

| Number | Name | Date |
|---|---|---|
| 972,748 | Breder | Oct. 11, 1910 |
| 2,033,829 | Helin | Mar. 10, 1936 |
| 2,184,792 | Clarke | Aug. 3, 1938 |
| 2,223,922 | Schofield | Feb. 5, 1940 |